United States Patent
Kang et al.

(10) Patent No.: US 12,209,500 B2
(45) Date of Patent: Jan. 28, 2025

(54) METHOD FOR MANUFACTURING TURBINE LABYRINTH SEAL USING WIRE ARC ADDITIVE MANUFACTURING

(71) Applicants: Hyun Ki Kang, Busan (KR); Sam Sub Byun, Busan (KR); Jong Yeob Lee, Busan (KR); Jae Wha Son, Busan (KR); Taek Ho Chung, Busan (KR)

(72) Inventors: Hyun Ki Kang, Busan (KR); Sam Sub Byun, Busan (KR); Jong Yeob Lee, Busan (KR); Jae Wha Son, Busan (KR); Taek Ho Chung, Busan (KR)

(73) Assignee: TURBO POWERTECH CO., LTD., Busan (KR)

( * ) Notice: Subject to any disclaimer, the term of this patent is extended or adjusted under 35 U.S.C. 154(b) by 0 days.

(21) Appl. No.: 18/392,391

(22) Filed: Dec. 21, 2023

(65) Prior Publication Data

US 2024/0410290 A1 Dec. 12, 2024

(30) Foreign Application Priority Data

Jun. 7, 2023 (KR) .................. 10-2023-0072931

(51) Int. Cl.
  *B23K 9/04* (2006.01)
  *B22F 5/00* (2006.01)
  (Continued)

(52) U.S. Cl.
  CPC .............. *F01D 11/08* (2013.01); *B22F 5/009* (2013.01); *B22F 10/25* (2021.01); *B23K 9/046* (2013.01);
  (Continued)

(58) Field of Classification Search
  CPC ... Y10T 29/49297; B23K 9/046; F01D 11/08; F05D 2230/31; F05D 2240/56;
  (Continued)

(56) References Cited

U.S. PATENT DOCUMENTS 6,286,211 B1 * 9/2001 Turnquist .................. B23H 9/00
  29/888.3
7,540,470 B1 * 6/2009 Blume .................. F04B 53/102
  137/902

(Continued)

FOREIGN PATENT DOCUMENTS

JP  11022402 A  1/1999
JP  2018-87379 A  6/2018
KR  10-2517064 B1  4/2023

*Primary Examiner* — Jermie E Cozart
(74) *Attorney, Agent, or Firm* — PARK LAW FIRM

(57) ABSTRACT

The present invention relates to a method for manufacturing a labyrinth seal using wire arc additive manufacturing, which is mounted between a diaphragm of a turbine and a turbine rotor to induce a smooth rotation of the turbine rotor and preventing gas leakage by minimizing friction between the diaphragm of a turbine and a turbine rotor when a rotating body such as the turbine rotor rotates inside a fixed body such as the diaphragm, and which includes a ring-shaped body part and a tooth part protruding on one side of the ring-shaped body part, wherein the labyrinth seal is deposition-manufactured by 3D printing, the body part is manufactured by the wire arc additive manufacturing, and the tooth part is manufactured by a directed energy deposition.

3 Claims, 3 Drawing Sheets

(51) Int. Cl.
  *B22F 10/25* (2021.01)
  *F01D 11/08* (2006.01)
  *B22F 10/28* (2021.01)

(52) U.S. Cl.
  CPC .......... *B22F 10/28* (2021.01); *F05D 2230/31* (2013.01); *F05D 2240/56* (2013.01); *Y10T 29/49297* (2015.01)

(58) Field of Classification Search
  CPC .......... B22F 5/009; B22F 10/25; B22F 10/28; B33Y 80/00
  See application file for complete search history.

(56) References Cited

U.S. PATENT DOCUMENTS

| | | | |
|---|---|---|---|
| 2016/0222798 A1* | 8/2016 | Snyder | .................. F01D 5/22 |
| 2019/0003596 A1* | 1/2019 | Marchione | .............. B22F 10/28 |
| 2019/0107003 A1* | 4/2019 | Sheedy | ................ F01D 11/122 |
| 2022/0154590 A1* | 5/2022 | Berard | .................. F16J 3/047 |

* cited by examiner

METHOD FOR MANUFACTURING TURBINE LABYRINTH SEAL USING WIRE ARC ADDITIVE MANUFACTURING

BACKGROUND OF THE INVENTION

Field of the Invention

The present invention relates to a method for manufacturing a turbine labyrinth seal which includes a hollow body part and a protrusion type tooth part formed on the outer surface of the body part to minimize friction between a rotating body, such as a turbine rotor, and a fixed body, such as a diaphragm, when the turbine rotor rotates, thereby inducing a smooth rotation of the turbine rotor and preventing gas leakage. More specifically, the present invention relates to a method for manufacturing a turbine labyrinth seal using wire arc additive manufacturing, in which the body part is manufactured by the wire arc additive manufacturing and the tooth part is manufactured by a directed energy deposition.

Background Art

In general, a turbine labyrinth seal is a crucial component for enhancing power generation efficiency since preventing leakage of high-temperature and high-pressure gases in the clearance between a diaphragm, which is mounted inside a turbine casing as a stator, and a rotating part known as the rotor and generating power by providing the maximum rotational force to a turbine blade through minimization of pressure loss to generate power.

Conventional manufacturing processes includes melting and continuous casting processes in a mill, hot/cold rolling, complicated machining and cutting processes, such as cutting, machining, thermal treatment, and the like, and has a material loss of 50% to 70% due to the complicated processes.

Moreover, ring mill and centrifugal casting processes which have recently been applied are suitable for manufacturing a round turbine labyrinth seal. However, such processes cannot avoid the material loss of about 50% to 70% due to the cutting process since necessitating the cutting process.

Therefore, to reduce the material loss, efforts have been made to overcome the problem through a new casting method of a near net shape close to the turbine labyrinth seal shape or a 3D printing process.

For the 3D printing process, labyrinth seals can be manufactured using either the direct energy deposition (DED) or the powder bed fusion (PBF) using metal powder. However, such methods using powder have disadvantages in that the cost is very high and the deposition speed is low compared to wires.

Specifically, as illustrated in FIG. 2, the labyrinth seal is divided into the body part and the tooth part. However, if the part occupying over 95% of the volume like the body part, the labyrinth seal is not economical since the cost is very expensive.

Recently, the wire arc additive manufacturing (WAAM) method has been identified as a deposition method that overcomes the disadvantages of the convention arts. Especially, for stainless steel deposition, since the wire material is cost-effective and the deposition speed is high, the wire arc additive manufacturing is being widely applied in the industry.

Thus, while the wire arc additive manufacturing is highly effective when being applied to the body part of the labyrinth seal, there were limitations in using the wire arc additive manufacturing for a part which is thin and have sharp tip, like the tooth part. In particular, the conventional manufacturing process for the labyrinth seal has a disadvantage in that there is a significant material loss due to machining having complicated processes including creating a molten casting material from stainless steel, forming a circular shape either through ring forging or centrifugal casting, rough cutting after heat treatment, cutting, and finish machining.

PATENT LITERATURE

Patent Documents

Patent Document 1: Korean Patent No. 10-0876603 (granted on Dec. 23, 2008)
Patent Document 2: Korean Patent No. 10-1442739 (granted on Sep. 15, 2014)
Patent Document 3: Korean Patent No. 10-1449473 (granted on Oct. 2, 2014)
Patent Document 4: Korean Patent No. 10-1546385 (granted on Aug. 17, 2015)
Patent Document 5: Korean Patent No. 10-1950924 (granted on Feb. 15, 2019)
Patent Document 6: Korean Patent No. 10-2293186 (granted on Aug. 18, 2021)

SUMMARY OF THE INVENTION

Accordingly, the present invention has been made to solve the above-mentioned problems occurring in the prior arts, and it is an object of the present invention to provide a method for manufacturing a turbine labyrinth seal which includes a ring-shaped body part and a tooth part protruding from one side of the body part, wherein the body part is manufactured by the wire arc additive manufacturing and the tooth part is manufactured by a directed energy deposition, thereby reducing the overall weight of the seal and waste of materials.

To accomplish the above object, according to the present invention, there is provided a method for manufacturing a labyrinth seal using wire arc additive manufacturing, which is mounted between a diaphragm of a turbine and a turbine rotor to induce a smooth rotation of the turbine rotor and preventing gas leakage by minimizing friction between the diaphragm of a turbine and a turbine rotor when a rotating body such as the turbine rotor rotates inside a fixed body such as the diaphragm, and which includes a ring-shaped body part and a tooth part protruding on one side of the ring-shaped body part, wherein the labyrinth seal is deposition-manufactured by 3D printing, the body part is manufactured by the wire arc additive manufacturing, and the tooth part is manufactured by a directed energy deposition.

As described above, the method for manufacturing a hollow type turbine labyrinth seal using 3D printing according to an embodiment of the present invention can manufacture a labyrinth seal which includes a ring-shaped body part and a tooth part protruding from one side of the body part, wherein the body part is manufactured by the wire arc additive manufacturing and the tooth part is manufactured by a directed energy deposition, thereby reducing the overall weight of the seal, improving assemblability, and enhancing productivity due to material and processing cost savings.

DETAILED DESCRIPTION OF THE PREFERRED EMBODIMENT

Figure 1:
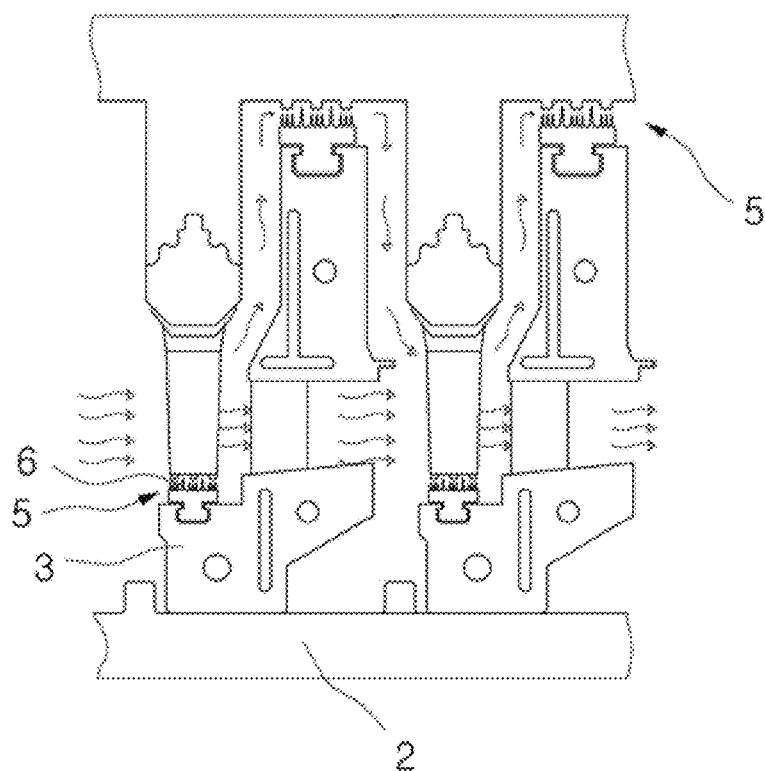
FIG. 1 is a cross-sectional view illustrating a state in which a seal is mounted on a turbine.

The present invention relates to a method for manufacturing a labyrinth seal, which is mounted between a diaphragm 200 of a turbine and a turbine rotor 100 to induce a smooth rotation of the turbine rotor and preventing gas leakage by minimizing friction between the diaphragm 200 of a turbine and a turbine rotor 100 when a rotating body such as the turbine rotor 100 rotates inside a fixed body such as the diaphragm 200, and which includes a ring-shaped body part 310 and a tooth part 320 protruding on one side of the ring-shaped body part 310, wherein the labyrinth seal 300 is deposition-manufactured by 3D printing, the body part 310 is manufactured by the wire arc additive manufacturing and the tooth part 320 is manufactured by a directed energy deposition.

The interior of the ring-shaped body part 310 is designed to have a space part 310a to reduce the overall weight of the labyrinth seal 300 and material waste.

The ring-shaped body part 310 is deposition-manufactured on the exterior of a hollow preformed body 330 by 3D printing, thereby ensuring the strength.

Additionally, during deposition on the exterior of the preformed body 330 through wire arc additive manufacturing, ultrasonic vibration is applied to the preformed body 330.

Moreover, the preformed body 330 may be made of the same material as the body part 310 or may have one or more metal components added to have better strength than the material of the body part 310.

In addition, the body part 310 includes a first body 311 of a cubical shape, and a second body 312 of a plate shape, which is placed on one side of the first body 311 and is relatively wider than the first body 311, wherein the interior of the second body 312 may include a core material 340 to reinforce the strength.

Hereinafter, with reference to the accompanying drawings, the method for manufacturing a turbine labyrinth seal using wire arc additive manufacturing will be described in detail.

FIG. 1 is a cross-sectional view illustrating a state in which a sealing device is mounted on a turbine.

Figure 4:
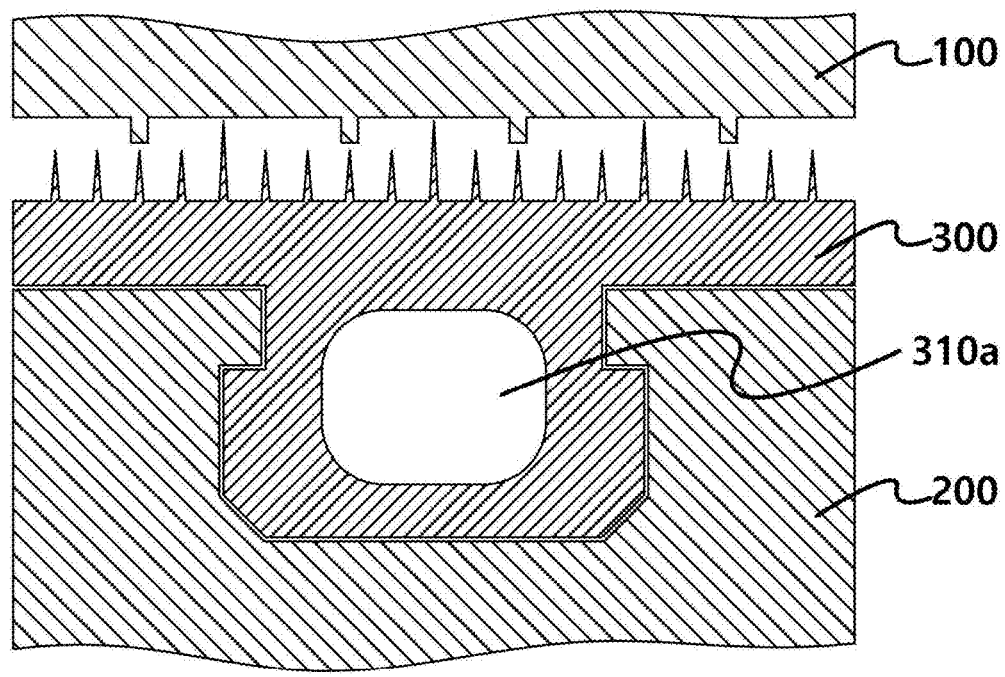
FIG. 4 is a partially enlarged cross-sectional view illustrating a state in which the labyrinth seal having a space part inside according to the method for manufacturing a turbine labyrinth seal using wire arc additive manufacturing according to a second embodiment of the present invention is mounted on a turbine.

As illustrated in FIG. 4, the labyrinth seal 300 is [is] mounted between a diaphragm 200 of a turbine and a turbine rotor 100 to induce a smooth rotation of the turbine rotor and preventing gas leakage by minimizing friction between the diaphragm 200 of a turbine and a turbine rotor 100 when a rotating body such as the turbine rotor 100 rotates inside a fixed body such as the diaphragm 200.

More specifically, the conventional labyrinth-type sealing device 5 is mounted on the outer and inner rings of a diaphragm 3 mounted in a casing.

Here, the labyrinth-type sealing device 5 has been widely used as a non-contact type sealing device of a turbine, and generates, by sharp teeth 6, a throttling process on a fluid flowing inside the turbine to reduce a leakage flow.

That is, the teeth 6 are sequentially arranged in the flow direction of the fluid to reduce the leakage flow of the fluid through a pressure drop effect generated during the throttling and expansion repetition process of the fluid.

For more details, reference is made to Korean Patent No. 10-1442739 (granted on Sep. 15, 2014), which has been filed on Apr. 8, 2014.

However, the conventional labyrinth-type sealing device having the teeth 6 causes significant material waste during the process of forming the ring-shaped body by centrifugal casting and cutting the labyrinth with a cutting tool, and the manufacturing duration is prolonged and productivity becomes worse since it is not easy to form the shape of the labyrinth.

Therefore, the present invention is to provide a manufacturing method of a labyrinth seal 300 to reduce the overall weight and material waste of the labyrinth seal 300.

Figure 2:
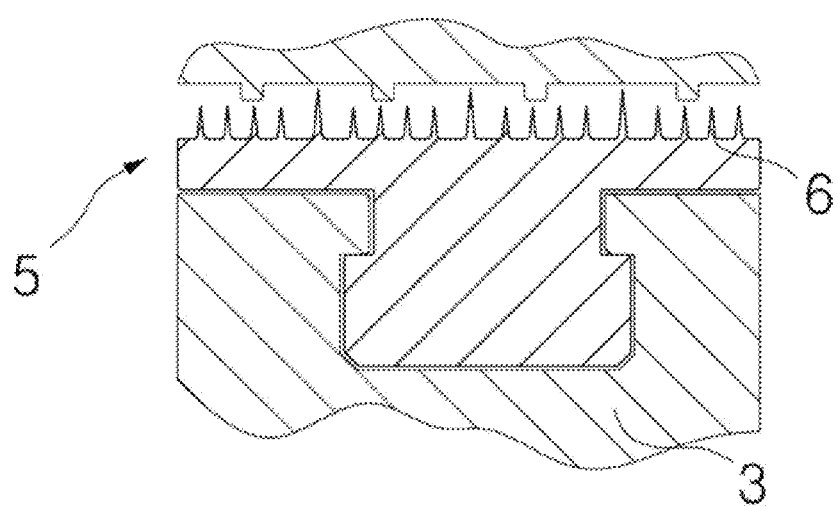
FIG. 2 is a cross-sectional view illustrating a state in which a seal is mounted according to a method for manufacturing a turbine labyrinth seal using wire arc additive manufacturing according to a first embodiment of the present invention.

FIG. 2 is a cross-sectional view illustrating a state in which a seal is mounted according to a method for manufacturing a turbine labyrinth seal using wire arc additive manufacturing according to a first embodiment of the present invention.

Figure 3:
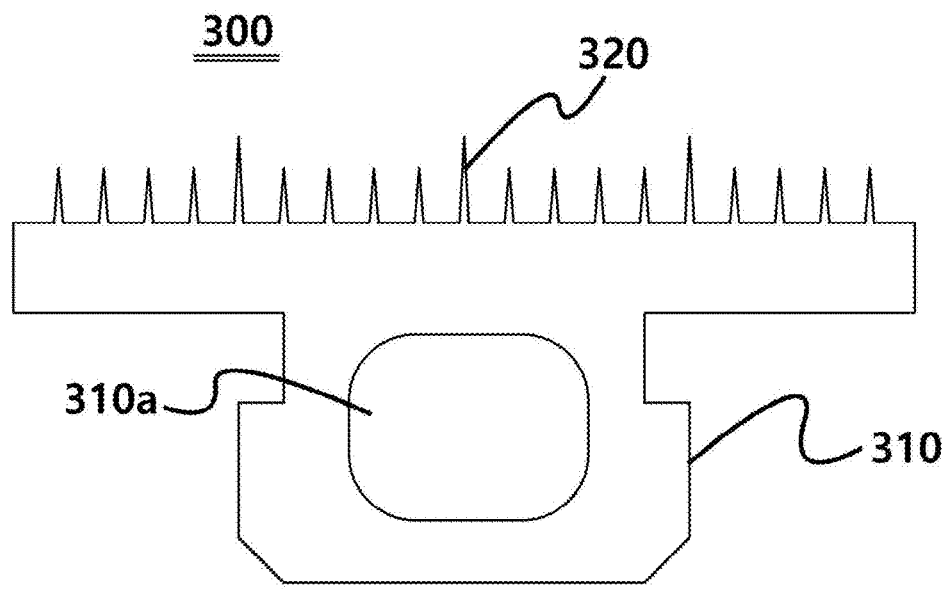
FIG. 3 is a schematically sectional view of a labyrinth seal having a space part inside according to a method for manufacturing a turbine labyrinth seal using wire arc additive manufacturing according to a second embodiment of the present invention.

As illustrated in FIG. 3, the labyrinth seal 300 of the present invention is deposition-manufactured by 3D printing, wherein the body part 310 is manufactured by the wire arc additive manufacturing and the tooth part 320 is manufactured by a directed energy deposition, thereby reducing the overall weight of the seal and material waste.

Additionally, a fillet at a portion where the body part 310 and the tooth part 320 of the labyrinth seal 300 meet together is formed with a rounded shape of R 0.2 to 5.0 mm.

For 3D printing deposition, the composition of the metal powder used during the directed energy deposition with the wire consists of 0.01 to 0.08 wt % of carbon (C), 0.03 to 0.08 wt % of silicon (Si), 0.02 to 1.0 wt % of phosphorus (P), 0.01 to 0.05 wt % of sulfur(S), 0.4 to 5.0 wt % of nickel (Ni), 10.0 to 18.0 wt % of chromium (Cr), 1.5 to 5.5 wt % of copper (Cu), 0.1 to 0.5 wt % of niobium (Nb), and the remainder being iron (Fe).

In addition, to reduce the overall weight of the labyrinth seal 300, a space part is formed in the central part of the body 310.

FIG. 3 is a schematically sectional view of a labyrinth seal having a space part inside according to a method for manufacturing a turbine labyrinth seal using wire arc additive manufacturing according to a second embodiment of the present invention, and FIG. 4 is a partially enlarged cross-sectional view illustrating a state in which the labyrinth seal having a space part inside according to the method for manufacturing a turbine labyrinth seal using wire arc additive manufacturing according to a second embodiment of the present invention is mounted on a turbine.

As illustrated in FIGS. 3 and 4, in the second embodiment, the labyrinth seal 300 is deposition-manufactured by 3D printing, wherein the ring-shaped body 310 is designed to have a space part 310a inside, thereby reducing the overall weight of the labyrinth seal 300 and the material waste.

Figure 5:
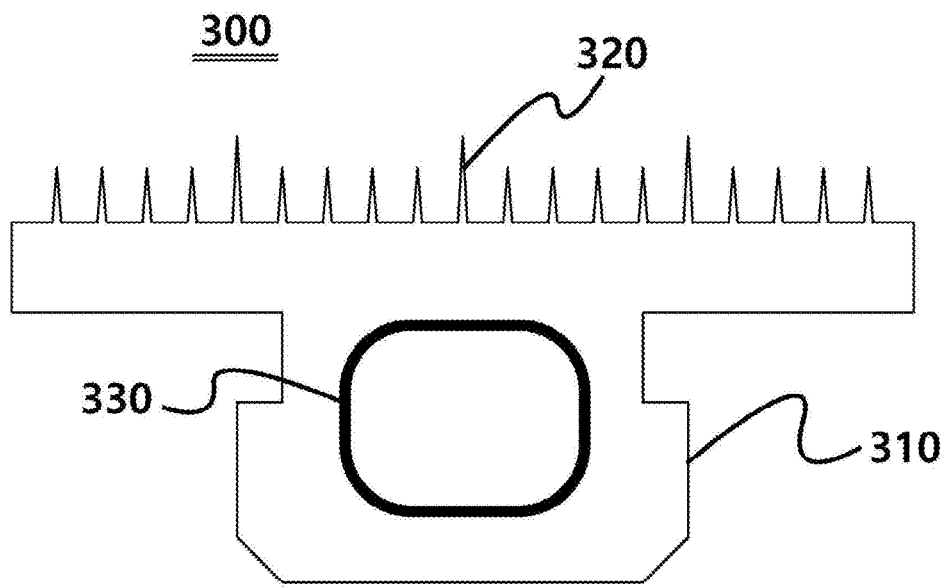
FIG. 5 is a schematically sectional view of a labyrinth seal having a preformed body according to a method for manufacturing a turbine labyrinth seal using wire arc additive manufacturing according to a third embodiment of the present invention.

FIG. 5 is a schematically sectional view of a labyrinth seal having a preformed body according to a method for manufacturing a turbine labyrinth seal using wire arc additive manufacturing according to a third embodiment of the present invention.

As illustrated in FIG. 5, since the strength of the labyrinth seal 300 may be weakened due to the space part 310a formed inside the ring-shaped body part 310, the ring-shaped body part 310 of the present invention is deposition-manufactured outside the hollow preformed body 330 by 3D printing to ensure strength.

The preformed body 330 is manufactured with a thickness ranging from 0.1 to 5.0 mm. The alloy composition of the preformed body 330 consists of 0.01 to 0.15 wt % of carbon (C), 0.03 to 0.5 wt % of silicon (Si), 0.02 to 0.08 wt % of phosphorus (P), 0.01 to 0.05 wt % of sulfur(S), 0.01 to 0.8 wt % of nickel (Ni), 10.0 to 15.0 wt % of chromium (Cr), 0.2 to 1.5 wt % of manganese (Mn), and the remainder being iron (Fe).

When performing wire arc additive manufacturing on the exterior of the preformed body 330 using a wire, ultrasonic vibration is applied to the preformed body 330, wherein the preformed body 330 may be made of the same material as the body part 310 or may have one or more metal components added to have better strength than the material of the body part 310.

If the preformed body 330 is formed into an angled shape, stress can concentrate on the edges when external loads are applied, and the edges may be damaged. Accordingly, it is preferred to manufacture the preformed body 330 with a round shape.

That is, if the preformed body 330 is formed into a square bar shape, there may occur a dead zone where deposition may not be effective during 3D printing deposition, and it causes deposition failure such as porosity and poor fusion.

In addition, if external loads are applied continuously, stress is concentrated on the edges, and it results in fatigue-induced destruction, thereby shortening the lifespan of the labyrinth seal. To overcome the problems, the preformed body in the present invention is manufactured with a curved surface, not an angled shape, to enhance the deposition efficiency of 3D printing and to disperse stress concentration, thereby improving the lifespan of the labyrinth seal.

Accordingly, the edges of the preformed body 330 with a suitable shape are formed with a rounded shape, specifically with a radius of R 3.0 to 20.0 mm.

More specifically, to transmit the optimal ultrasonic waves to a deposition part, a vibrator (not illustrated) is attached 0.5 to 2000 mm away from the deposition part. While vibrating the base material, which is the preformed body 330, the wire arc additive manufacturing is performed.

That is, the vibrator comes into contact with the surface of the preformed body 330 at a distance of 0.5 to 2000 mm from the deposition point.

As described above, when ultrasonic vibration and the wire arc additive manufacturing are performed at the same time, since the porosity in the deposition part is reduced to 0.01% or less and the size of the crystalline grains is reduced to 50% or less compared to traditional wire arc fusion, mechanical properties such as hardness, strength, wear, fatigue, and creep are increased.

Additionally, to achieve a more robust bonding during deposition on the surface of the preformed body 330, infrared radiation can be applied to the preformed body 330 or the deposition powder.

In the case of Inconel super heat resistant material with high melting temperature, to control solidification speed, the wire arc additive manufacturing is performed by using an infrared heater wavelength of 10 to 1000 microns (μm) while maintaining the base material temperature in the range of 25 to 900° C.

Figure 6:
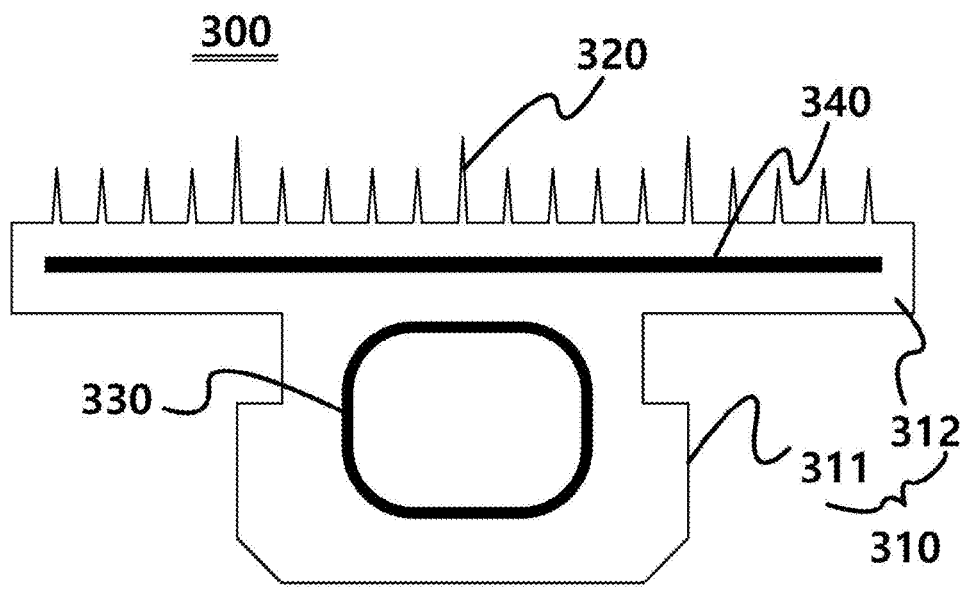
FIG. 6 is a schematically sectional view of a labyrinth seal according to the method for manufacturing a turbine labyrinth seal using wire arc additive manufacturing according to a fourth embodiment of the present invention.

FIG. 6 is a schematically sectional view of a labyrinth seal according to the method for manufacturing a turbine labyrinth seal using wire arc additive manufacturing according to a fourth embodiment of the present invention.

As illustrated in FIG. 6, the body part 310 of the labyrinth seal 300 of the present invention includes a first body 311 of a cubical shape, and a second body 312 of a plate shape, which is placed on one side of the first body 311 and is relatively wider than the first body 311, wherein the interior of the second body 312 may include a core material 340 to reinforce the strength.

As described above, the method for manufacturing a hollow type turbine labyrinth seal using 3D printing according to an embodiment of the present invention can manufacture a labyrinth seal which includes a ring-shaped body part and a tooth part protruding from one side of the body part, wherein the body part is manufactured by the wire arc additive manufacturing and the tooth part is manufactured by a directed energy deposition, thereby reducing the overall weight of the seal, improving assemblability, and enhancing productivity due to material and processing cost savings.

What is claimed is:

1. A method for manufacturing a labyrinth seal using wire arc additive manufacturing, which is mounted between a diaphragm of a turbine and a turbine rotor to induce a smooth rotation of the turbine rotor and preventing gas leakage by minimizing friction between the diaphragm of a turbine and a turbine rotor when a rotating turbine rotor rotates inside a fixed diaphragm, and which includes a ring-shaped body part and a tooth part protruding on one side of the ring-shaped body part, wherein the labyrinth seal is deposition-manufactured by 3D printing, the body part is manufactured by the wire arc additive manufacturing, and the tooth part is manufactured by a directed energy deposition, wherein the interior of the ring-shaped body part is designed to have a space part to reduce the overall weight of the labyrinth seal and material waste, and the ring-shaped body part is deposition-manufactured on the exterior of a hollow preformed body by 3D printing, thereby ensuring the strength of the ring-shaped body part, and wherein during deposition on the exterior of the preformed body through wire arc additive manufacturing, ultrasonic vibration is applied to the preformed body.

2. The method for manufacturing a labyrinth seal according to claim 1, wherein the preformed body is made of the same material as the body part or has one or more metal components added to have better strength than the material of the body part.

3. The method for manufacturing a labyrinth seal according to claim 1, wherein the body part includes a first body of a cubical shape, and a second body of a plate shape, which is placed on one side of the first body and is relatively wider than the first body, wherein the interior of the second body includes a core material to reinforce the strength of the body part.

\* \* \* \* \*